(12) United States Patent
Lee

(10) Patent No.: US 10,883,548 B2
(45) Date of Patent: Jan. 5, 2021

(54) ELECTRIC AXLE WITH DIFFERENTIAL SUN GEAR DISCONNECT CLUTCH

(71) Applicant: SCHAEFFLER TECHNOLOGIES AG & CO. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 12 days.

(21) Appl. No.: 16/376,153

(22) Filed: Apr. 5, 2019

(65) Prior Publication Data

US 2020/0318693 A1    Oct. 8, 2020

(51) Int. Cl.
| | |
|---|---|
| F16H 37/08 | (2006.01) |
| F16D 11/16 | (2006.01) |
| B60L 15/20 | (2006.01) |
| B60L 3/00 | (2019.01) |
| F16H 48/11 | (2012.01) |

(52) U.S. Cl.
CPC ............ F16D 11/16 (2013.01); B60L 3/0061 (2013.01); B60L 15/2036 (2013.01); F16H 37/082 (2013.01); F16H 48/11 (2013.01)

(58) Field of Classification Search
None
See application file for complete search history.

(56) References Cited

U.S. PATENT DOCUMENTS

| | | | | |
|---|---|---|---|---|
| 4,677,875 | A * | 7/1987 | Batchelor | B60K 17/3462 475/85 |
| 6,378,638 | B1 * | 4/2002 | Mizon | B60K 6/26 180/65.6 |
| 7,101,301 | B2 * | 9/2006 | Haka | B60K 17/346 210/224 |
| 8,343,000 | B2 * | 1/2013 | Karlsson | B60L 15/20 180/65.6 |
| 8,424,625 | B2 * | 4/2013 | Ishii | B60K 6/26 180/65.31 |
| 9,657,825 | B2 | 5/2017 | Ohmura et al. | |
| 2003/0116117 | A1 | 6/2003 | Tonnqvist et al. | |
| 2004/0061393 | A1 | 4/2004 | Neubauer et al. | |
| 2015/0151634 | A1 | 6/2015 | Smetana | |
| 2018/0076687 | A1 | 3/2018 | Pritchard et al. | |
| 2019/0113119 | A1 * | 4/2019 | Keeney | B60K 23/08 |

FOREIGN PATENT DOCUMENTS

KR    1020190029574    3/2019

* cited by examiner

*Primary Examiner* — Dirk Wright
(74) *Attorney, Agent, or Firm* — Brooks Kushman P.C.

(57) ABSTRACT

An electric axle is configured to selectively enable an electric motor to power a drive shall of a vehicle. The electric axle includes a differential planetary gearset configured to transmit drive torque to a drive shaft. The differential planetary gearset has a sun gear configured to circumscribe the drive shaft. A clutch is configured to selectively non-rotatably couple the sun gear to the drive shaft. The clutch may include a sleeve moveable in an axial direction.

17 Claims, 7 Drawing Sheets

ELECTRIC AXLE WITH DIFFERENTIAL SUN GEAR DISCONNECT CLUTCH

TECHNICAL FIELD

The present disclosure relates to an electric axle ("e-axle") equipped with a clutch for selectively enabling an electric motor to power wheels associated with that axle.

BACKGROUND

Electric motors are increasingly used as sources of drive power in vehicles to provide alternatives to conventional internal combustion engines that require fossil fuels. Considerable efforts have already been made to improve the suitability of electric motors in all-electric or hybrid vehicles.

Electric axles, also referred to as e-axles or eAxles, are known in the art to transmit drive torque from the electric motor to an output, and optionally via step down or step up drive gearings. For example, a planetary gearset can be provided for transferring torque from the electric motor to one or more axles while enabling a rotor of the electric motor to spin at a different speed than the axle due to the operation of the planetary gearing.

SUMMARY

According to one embodiment, an electric axle is configured to selectively enable an electric motor to power a drive shaft of a vehicle. The electric axle includes a differential planetary gearset configured to transmit drive torque to a drive shaft. The differential planetary gearset has a sun gear configured to circumscribe the drive shaft. A clutch is configured to selectively non-rotatably couple the sun gear to the drive shaft.

In another embodiment, an electric axle for a drive shaft includes a housing, and a differential planetary gearset disposed at least partially within the housing. The differential planetary gearset includes a sun gear rotatable within the housing. The sun gear has an inner surface defining teeth. A sleeve is disposed radially inward of the sun gear. The sleeve has an outer surface defining teeth that mesh with the teeth of the sun gear. The sleeve is axially-moveable between (i) unlocked or disengaged position in which the differential sun gear can rotate independently of the drive shaft, and (ii) a locked or engaged position in which the sleeve non-rotatably couples the differential sun gear with the drive shaft.

In yet another embodiment, an electric axle includes a planetary gearset including a sun gear, and a sleeve sized to be fitted about a drive shaft. The sleeve is configured to move in an axial direction in a gap between the sun gear and the drive shaft. An actuator assembly is configured to force the sleeve in the axial direction to selectively non-rotatably lock the sleeve with both the sun gear and the drive shaft.

DETAILED DESCRIPTION

Figure 1:
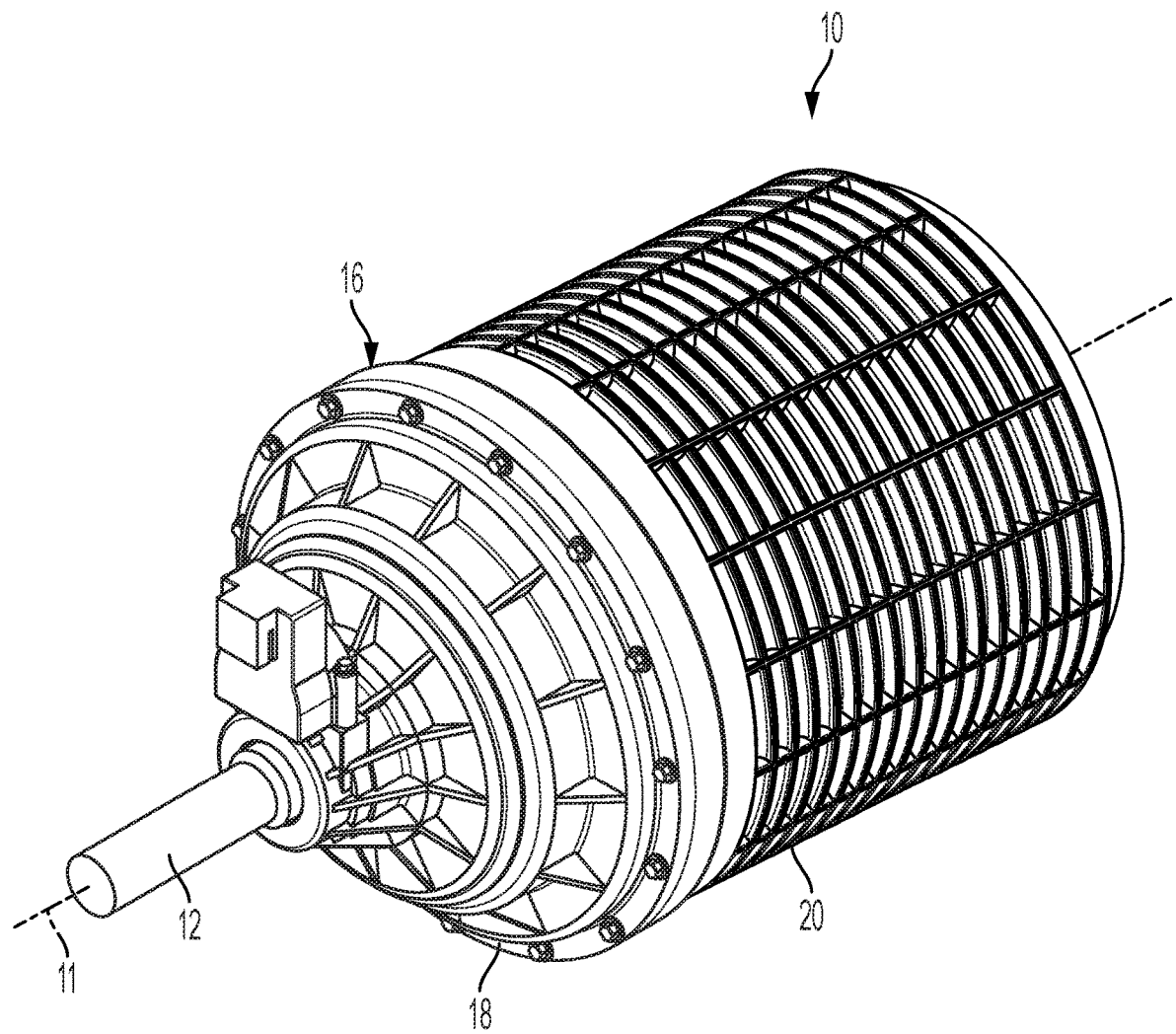
FIG. 1 is a perspective view of an assembled electric axle assembly, or electric axle, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc, also are relative to the central axis. The terms "front," "rear," "upper" and "lower" designate directions in the drawings to which reference is made.

In hybrid electric vehicles, electric-only vehicles, and the like, the vehicle is at least partially driven by an electric motor. The electric motor may be powered by a high-voltage battery pack, for example, and may be capable of performing regenerative braking to convert the vehicle's kinetic energy into electric energy for storage in the battery.

Electric axles (also referred to as e-axles, eAxles, electronic axles, or the like) can be situated on a drive shaft assembly of the vehicle. The electric axle can function as a differential, allowing the drive shafts to assume different rotational speeds when, for example, the vehicle is turning. The electric axle can also transfer power from the motor to the drive shafts via step-up or step-down gearing arrangements. The electric axle can remove the need for a drive shaft or prop shaft, and each front and rear axle can be independently powered or propelled.

According to embodiments described herein, an electric axle is provided with a planetary differential having a sun gear, and a disconnect clutch that selectively engages the sun gear. When the clutch is open or disengaged, the motor is unable to power the drive shafts. In this mode, the wheels on those drive shafts can rotate passively as the vehicle is traveling. When the clutch is closed or engaged, the sun gear connected to the drive shall, which enables torque from the electric motor to transfer to the drive shafts through the planetary differential. In particular embodiments described herein, the clutch includes a sleeve acting as a dog clutch. The sleeve can be axially moveable to open or close the clutch. The sleeve can have an outer surface splined to always engage and rotate with the sun gear. The sleeve can also have an inner surface that meshes with the axle shaft when the sleeve is moved axially. When the sleeve is moved axially out of mesh, the axle shaft can freely rotate relative to the sun gear. These concepts are merely exemplary of a clutch provided at a sun gear of a differential, and further description of these concepts are described in the embodiments explained below.

The arrangements described below are but one embodiment of a disconnect clutch in an electric axle. This disclosure fully incorporates the teachings of U.S. patent application Ser. No. 16/376,125 by reference herein, which further disclose embodiments for a disconnect clutch in an electric axle. The teachings of this disclosure and that of U.S. patent application Ser. No. 16/376,125 can be combined to form additional embodiments.

Figure 2:
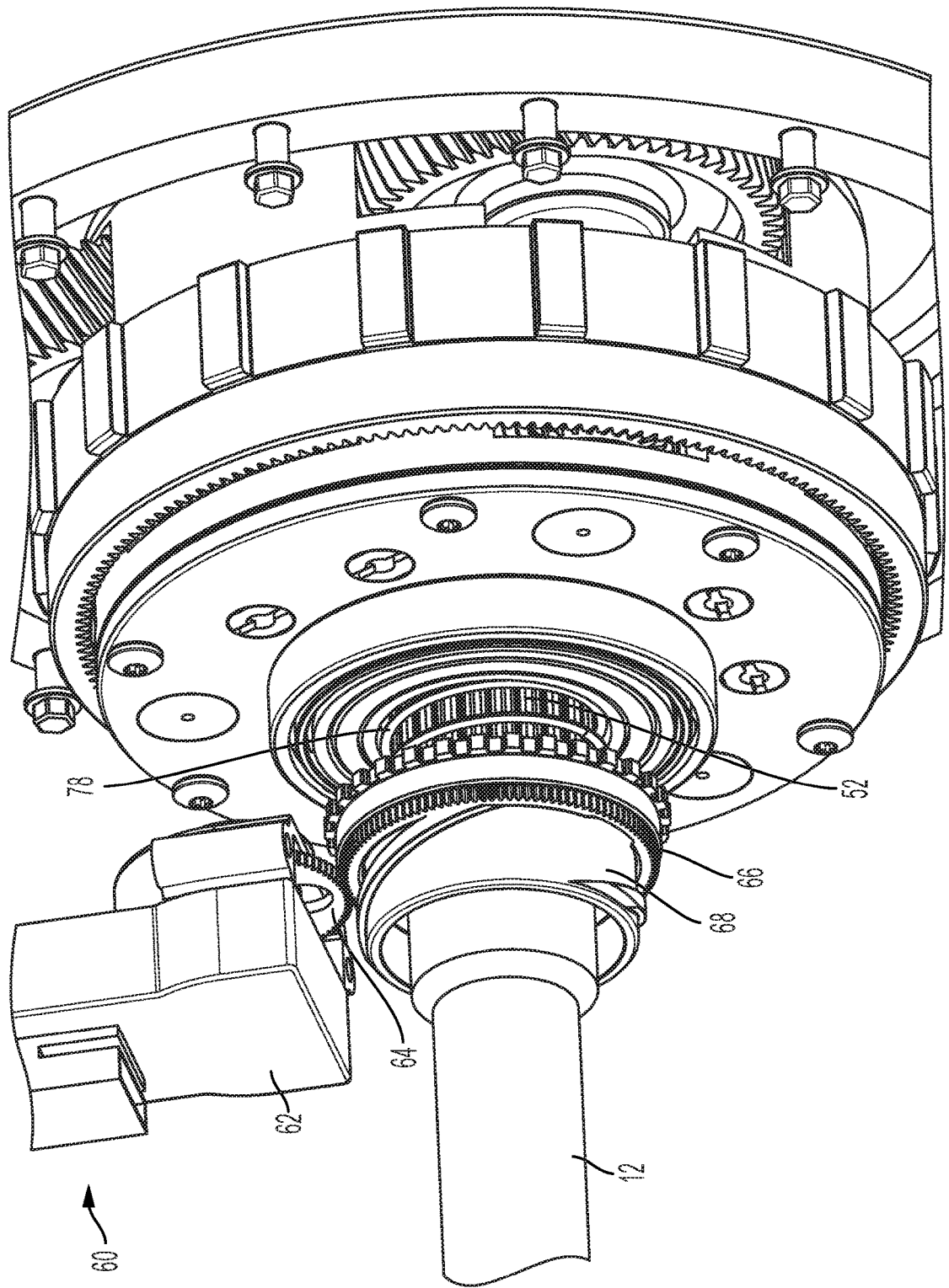
FIG. 2 is an enlarged perspective view of a portion of the electric axle with the outer housing removed, according to one embodiment.
Figure 3:
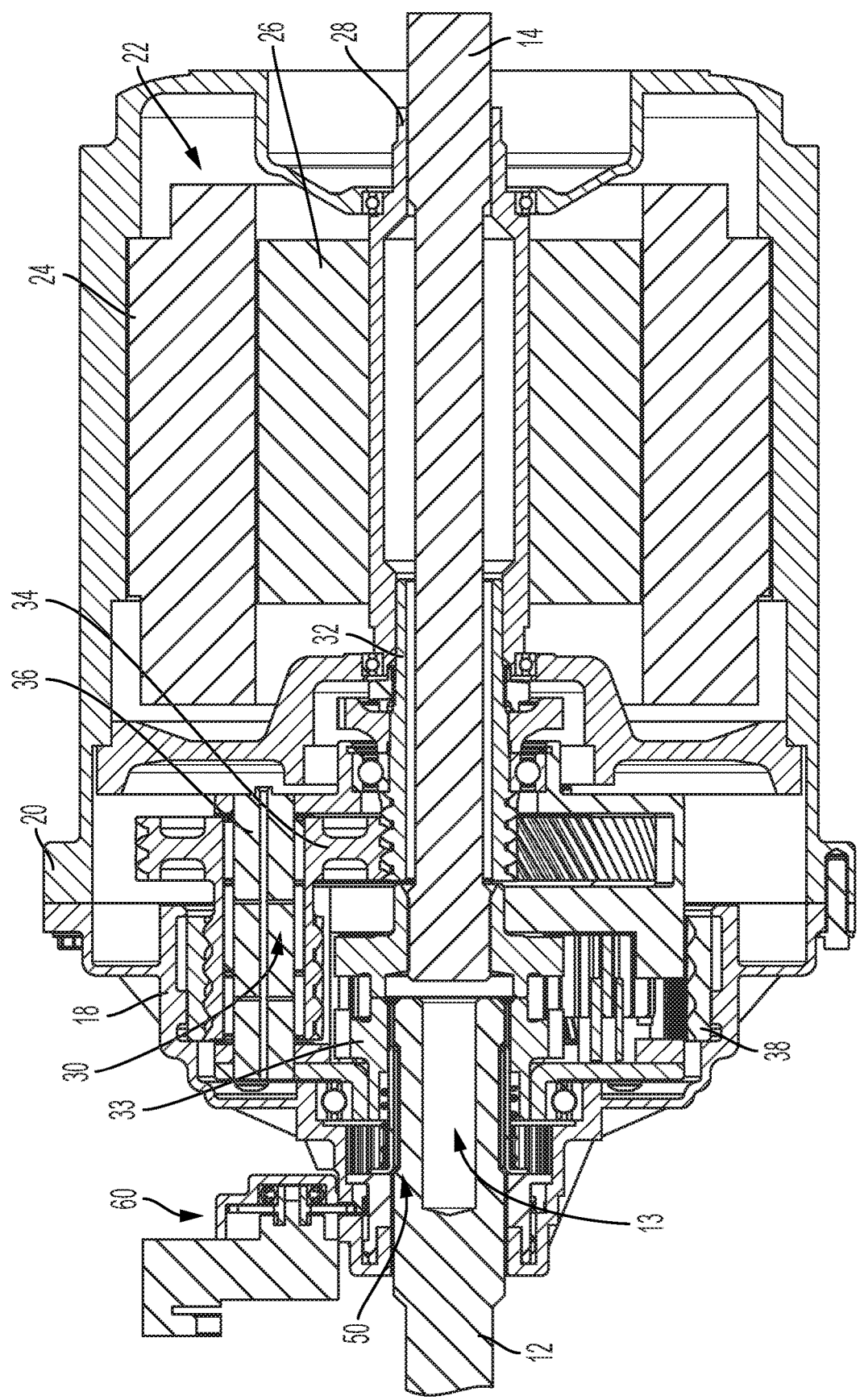
FIG. 3 is a cross-sectional view of the electric axle of FIG. 1.
Figure 4:
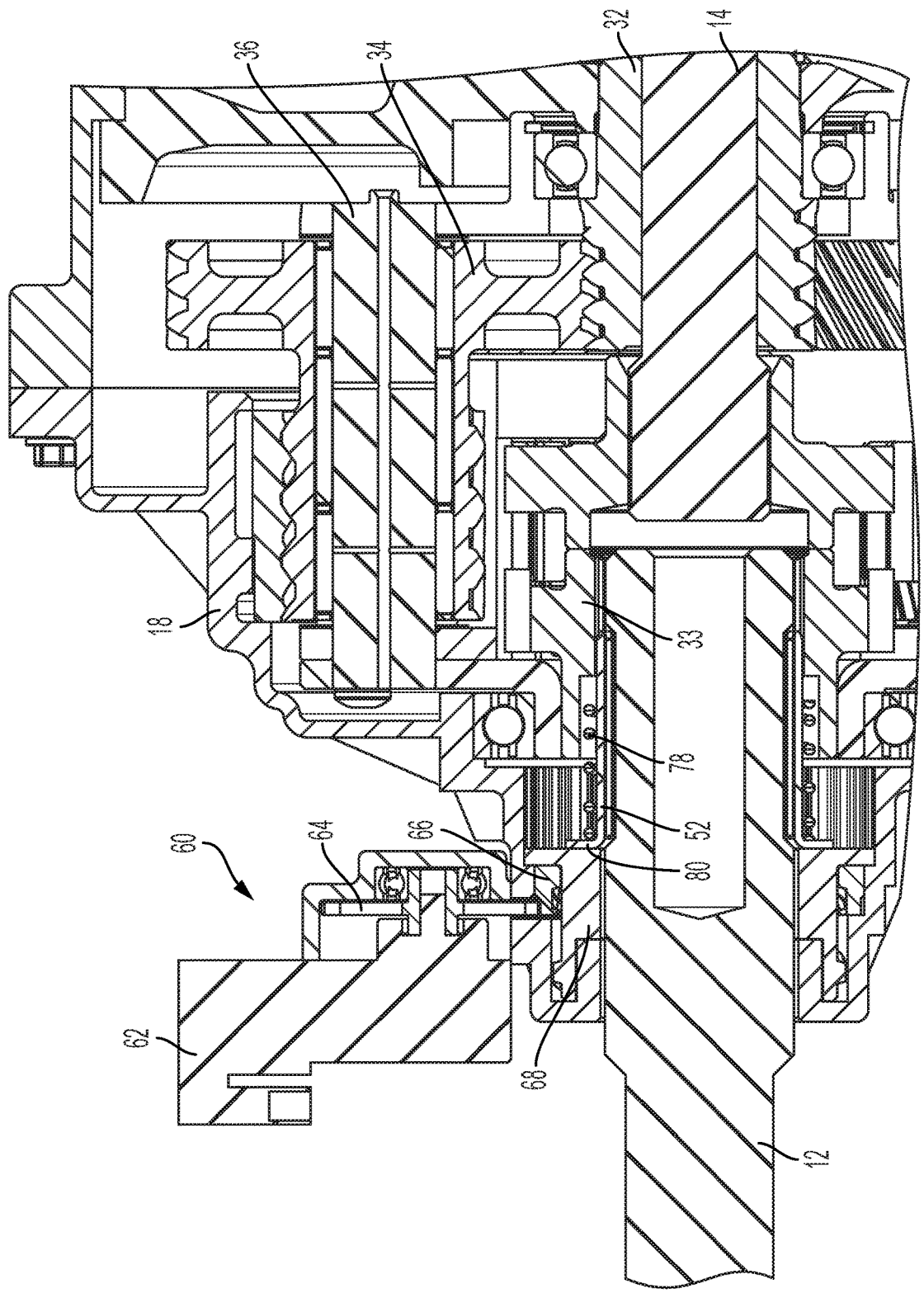
FIG. 4 is an enlarged cross-sectional view of a portion of the electric axle of FIG. 3, with a clutch of the electric axle in an unlocked or disengaged mode, according to one embodiment.
Figure 5:
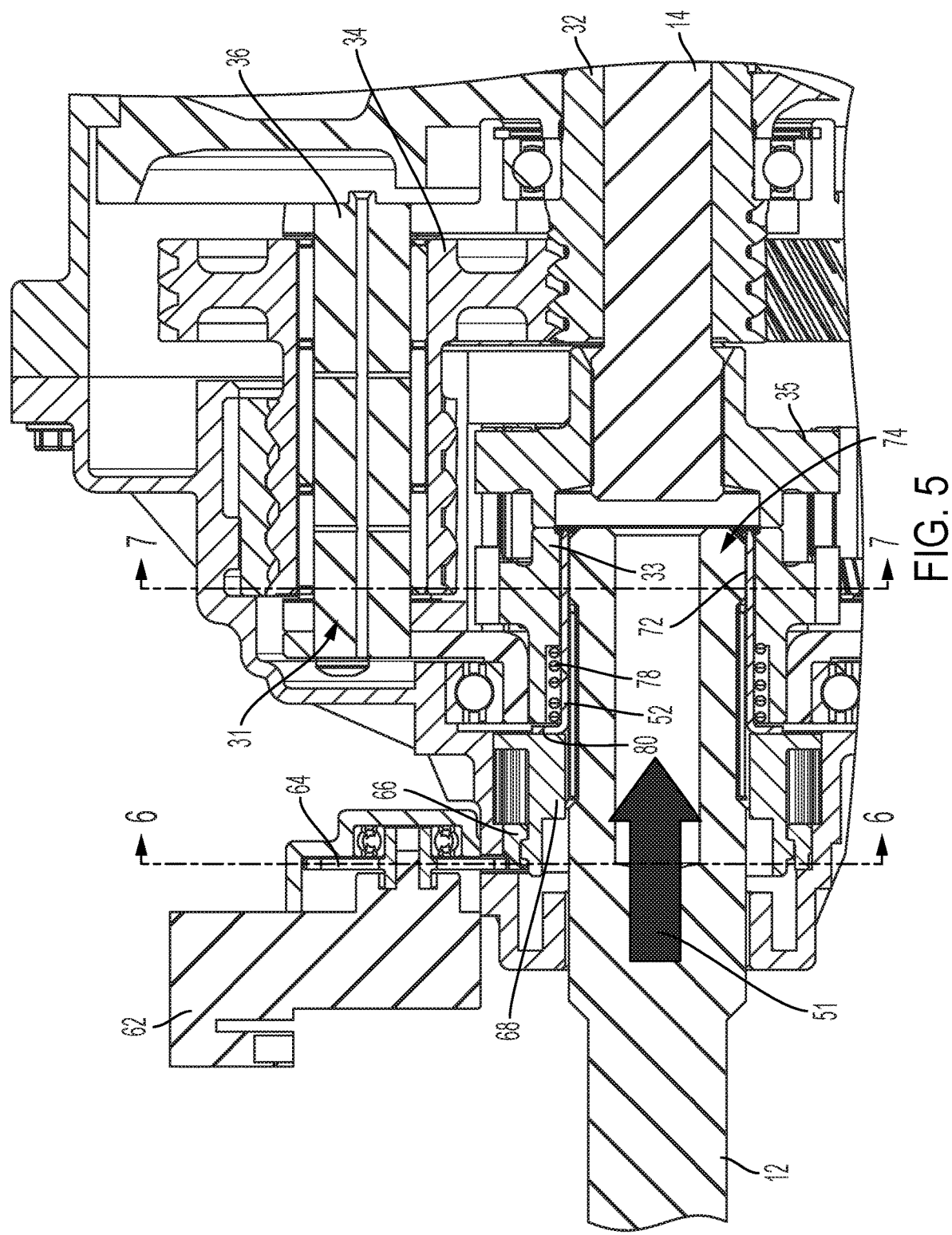
FIG. 5 is an enlarged cross-sectional view of the portion of the electric axle of FIG. 4, with the clutch of the electric axle in an engaged or locked mode, according to one embodiment.
Figure 6:
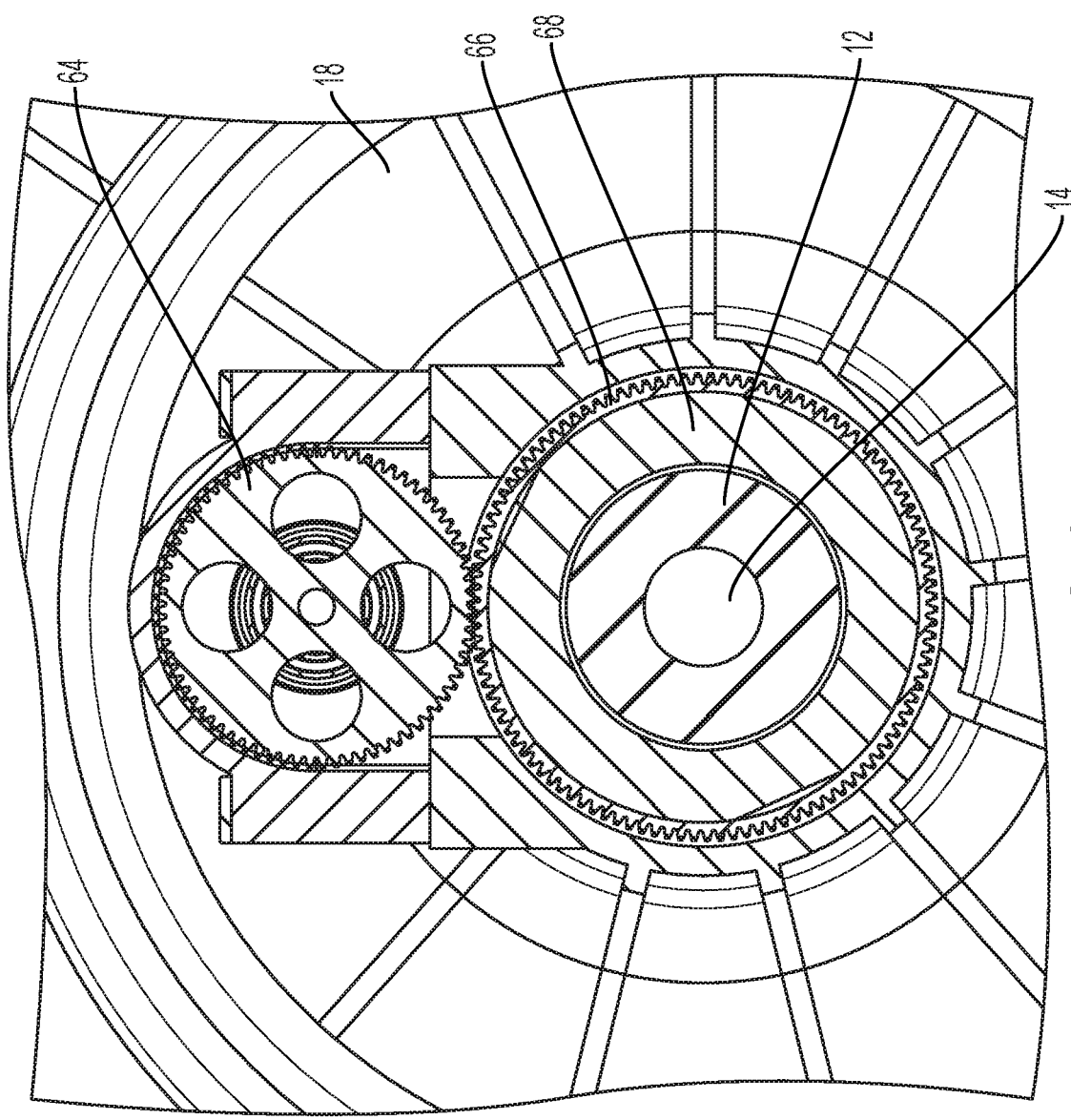
FIG. 6 is a front cross-sectional view of a clutch actuator assembly for actuating the clutch of the electric axle taken along line 6-6 of FIG. 5, according to one embodiment.
Figure 7:
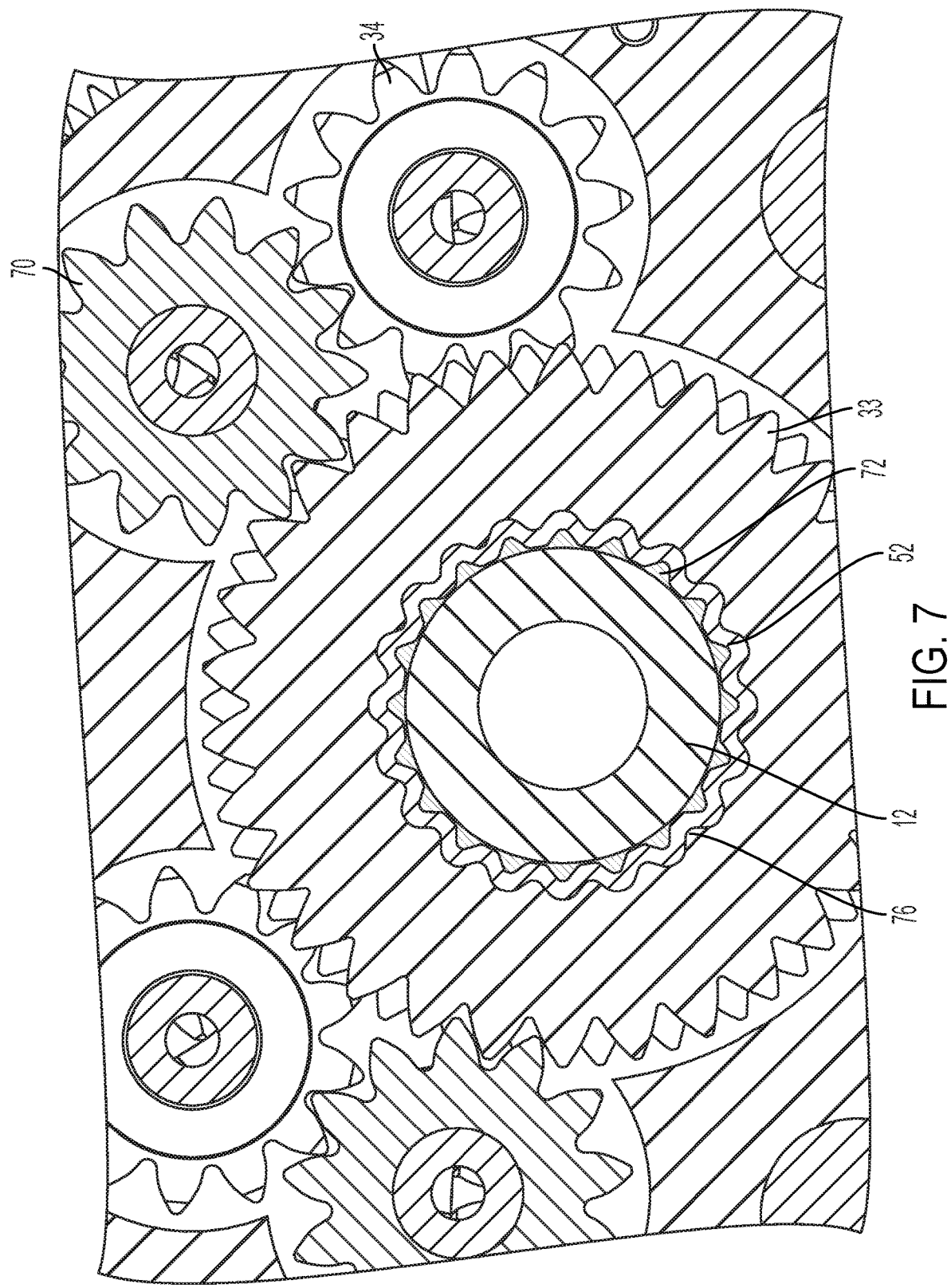
FIG. 7 is a front cross-sectional view of a portion of the electric axle 10 in the engaged or locked mode along line 7-7 of FIG. 5, according to one embodiment.

FIG. 1 illustrates an assembled electric axle assembly, or electric axle 10. FIG. 2 shows an enlarged view of a portion of the electric axle assembly 10 with the outer housing removed for clarity. FIG. 3 shows a cross-sectional view of the electric axle 10, and FIG. 4 shows an enlarged cross-sectional view of a portion of the electric axle 10 with a clutch in a disengaged or unlocked anode. FIG. 5 shows the electric axle 10 with the clutch in an engaged or locked mode. FIG. 6 shows the interaction of a clutch actuator assembly about a drive shaft. FIG. 7 shows an enlarged region of the electric axle 10 in the engaged or locked mode of FIG. 5, and FIG. 8 shows a front cross-sectional view of a portion of the electric axle 10 in the engaged or locked mode. Reference is made below to parts shown in at least one of these Figures.

The electric axle 10 is disposed about a central axis 11, and about a pair of drive shafts, such as a first drive shaft 12 and a second drive shaft 14. Each of the drive shafts 12, 14 are configured to rotate about the axis 11 to rotate a corresponding wheel (not shown). Drive shaft 12 may have a hollow core 13, which can reduce the overall mass of the shaft 12. An outer housing 16 or shell is provided (removed in FIG. 2), and may include a first housing shell 18 and a second housing shell 20.

Housed within the second housing shell 20 is an electric motor 22. The electric motor 22 may be powered by a high-voltage battery (not shown) such that the motor is configured to power the drive shafts 12, 14. The motor 22 may include a stator 24, and a rotor 26 with a corresponding rotor shaft 28 that are configured to rotate relative to the stator 24 about the axis 11 when powered. The rotor shaft 28 is rotatably coupled to the second housing shell 20, such that the rotor 26 can rotate within the housing 16 while the housing 16 remains fixed or grounded during operation. The rotor shaft 28 may also be coupled to the drive shaft 14.

The electric axle 10 includes a planetary gearset 30. In one embodiment, the planetary gearset 30 includes a sun gear 32 non-rotatably coupled to the rotor shaft 28 (e.g., via a spline), for example. The sun gear 32 is coupled to planet gears 34 with a meshing engagement, for example. This allows the planet gears 34 to rotate about each of their own central axis while collectively rotating about the sun gear 32. A carrier 36 supports the planet gears 34. The planet gears 34 are also connected to a ring gear 38 in a meshing engagement such that the planet gears 34 can rotate within (and relative to) the ring, gear 38.

The electric axle 10 also includes a differential that includes a differential planetary gearset 31 that provides torque vectoring functions. The differential planetary gearset includes a differential sun gear 33 that circumscribes the shaft 12. The differential planetary gearset may also share a common carrier 36 as the planetary gearset 30, or have a carrier mated or otherwise configured to rotate with the carrier 36. There may be a pair of opposing differential sun gears. For example, a first differential sun gear 33 may be disposed about the shaft 12, while a second differential sun gear 35 may be disposed about the shaft 14. The second differential sun gear 35 may be directly engaged (e.g., meshed, splined) with the shaft 14. The first differential sun gear 33, on the other hand, may be radially spaced or gapped from the shaft. 12 to accommodate a sleeve 52, described below.

A clutch assembly or clutch 50 is also provided for selectively non-rotatably fixing one axle shaft (e.g., shaft 12) to a corresponding differential sun gear 33. In other words, the clutch 50 can be activated to non-rotatably engage the shaft 12 with the differential sun gear 33, and deactivated to uncouple the shaft 12 with the differential sun gear 33 and allow free rotation therebetween. This point of connection when the clutch is engaged allows torque to flow through the planetary differential.

The clutch assembly 50 includes a sleeve 52, also referred to as a dog clutch sleeve or dog clutch member. The sleeve 52 has an outer surface facing away from the central axis 11 that is directly engaged (e.g., splined) with an inner surface of the differential sun gear 33. While the sleeve 52 is engaged with the differential sun gear 33, the sleeve 52 can move axially (e.g., to the right in the orientation of FIG. 2) to also engage the outer surface of the shaft 12. In other words, the axle shaft 12 is splined to mate with the inner surface of the sleeve 52 when the sleeve 52 is axially moved into mesh with the shaft 12. When the sleeve 52 is moved axially out of mesh e.g. to the left in the orientation of FIG. 2), the axle shaft 12 can freely rotate inside the inner diameter of the differential sun gear 33.

An actuator assembly 60 is also provided for moving the sleeve 52 in and out of engagement between the shaft 12 and the sun gear 32. At least a portion of the actuator assembly 60 may be mounted or otherwise coupled to the outside of the housing 18. The actuator assembly 60 includes an electric motor 62 that, when energized, is configured to rotate a gear set 64. The gear set 64 is in meshing engagement with an actuator nut 66. The actuator nut 66 is connected to an actuator 68 with a threading engagement. The actuator 68 is connected to the sleeve 52 in a face-to-face engagement, for example. Therefore, as the motor 62 rotates the gear set 64, the gear set 64 spins the actuator nut 66 along the threading of the actuator 68, forcing the actuator 68 axially.

Referring to FIGS. 3 and 4, the clutch assembly 50 is shown in a disengaged state. The sleeve 52 is engaged with the sun gear 32 via a mesh or spline connection, but the sleeve 52 is not engaged with the shaft 12 such that the shall 12 and sleeve 52 can rotate independently of one another.

Engagement of the clutch assembly 50 is shown in FIGS. 5 and 7. Activation of the actuator assembly 60 via energizing of the motor 62 (as described above) results in the axial movement of the sleeve 52, as indicated by arrow 51. When in the engaged or locked mode, the inner surface of the sleeve 52 is splined or otherwise meshed with the shaft 12, and the outer surface of the sleeve 52 is splined or otherwise meshed with the differential sun gear 33. This non-rotatably fixes the shaft 12 with the differential sun gear 33, allowing torque to transfer through the differential planetary gearset and into the shaft 12 (or vice versa). Differential planet gears 70 mesh with and rotate about the differential sun gear 33, as shown in FIG. 7.

As shown in FIGS. 5 and 7, the shaft 12 may be provided with spline features 72 at only an end region 74 of the shaft 12. The spline features 72 extend outwardly therefrom to define a larger outer diameter than a remainder of the shaft 12. These spline features 72 may include radially-extending teeth that are sized and configured to mesh with the inner surface of the sleeve 52 when the sleeve 52 is actuated in the engaged or locked mode. Likewise, the differential sun gear 33 has spline features 76 that may include radially-extending teeth configured to mesh with the outer surface of the sleeve 52 when the sleeve is actuated in the engaged or locked mode. The spline features 76 of the differential sun gear 33 may also continue to engage the outer surface of the sleeve 52 even when the sleeve is located in the disengaged or unlocked mode (see, e.g., FIG. 4).

A spring 78 may be provided about the sleeve 52. The spring 78 may be biased to return the sleeve 52 to the unlocked or disengaged mode when the actuator assembly is no longer forcing the sleeve 52 in the locked or engaged mode. In one embodiment, the spring 78 is located in a gap axially between the sleeve 52 and the differential sun gear 33. The spring 78 compresses when the sleeve 52 is moved axially to the locked or engaged mode, forcing the spring in compression to bias the sleeve 52 back to its unlocked or disengaged mode. The sleeve 52 may be provided with a radially-extending flange 80 at one end to contain the spring axially between the sleeve 52 and the differential sun gear 33.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Parts List

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 electric axle
11 central axis
12 first drive shaft
13 hollow core
14 second drive shaft
16 outer housing
18 first housing shell
20 second housing shell
22 electric motor
24 stator
26 rotor
28 rotor shaft
30 planetary gearset
31 differential planetary gearset
32 sun gear
33 differential sun gear
34 planet gears
35 second differential sun gear
36 carrier
38 ring gear
50 clutch assembly
51 arrow
52 sleeve
60 actuator assembly
62 electric motor
64 gear set
66 actuator nut
68 actuator
70 differential planet gears
72 spline features
74 end region
76 spline features
78 spring
80 flange

What is claimed is:

1. An electric axle configured to selectively enable an electric motor to power a drive shaft of a vehicle, the electric axle comprising:
   a differential planetary gearset configured to transmit drive torque to a drive shaft, the differential planetary gearset having a sun gear configured to circumscribe the drive shaft;
   a clutch configured to selectively non-rotatably couple the sun gear to the drive shaft, wherein the clutch includes a sleeve configured to move in an axial direction, wherein the sleeve selectively engages the sun gear when moved in the axial direction into a locked or engaged mode; and
   a spring wrapped about the sleeve and configured to return the sleeve to an unlocked or disengaged mode.

2. The electric axle of claim 1, wherein the sun gear has an inner surface having a first set of radially-extending teeth, and the sleeve has an outer surface having a second set of radially-extending teeth that mesh with the first set of radially-extending teeth when the clutch is in the locked or engaged mode.

3. The electric axle of claim 1, wherein the sleeve has an inner surface having radially-extending teeth configured to mesh with corresponding teeth of the drive shaft.

4. The electric axle of claim 1, further comprising an actuator assembly including an actuator configured to move in the axial direction to force the sleeve in the axial direction.

5. The electric axle of claim 4, wherein the actuator assembly includes a gear set configured to rotate an actuator nut, wherein rotation of the actuator nut forces the actuator in the axial direction.

6. The electric axle of claim 5, wherein the actuator nut has threading that mate with corresponding threading of the actuator.

7. An electric axle for a drive shaft, the electric axle comprising:
   a housing;
   a differential planetary gearset disposed at least partially within the housing, the differential planetary gearset including a sun gear rotatable within the housing, the sun gear having an inner surface defining teeth; and
   a sleeve disposed radially inward of the sun gear, the sleeve having an outer surface defining teeth that mesh with the teeth of the sun gear;
   wherein the sleeve is axially-moveable between (i) unlocked or disengaged position in which the sun gear can rotate independently of a drive shaft, and (ii) a locked or engaged position in which the sleeve non-rotatably couples the sun gear with the drive shaft.

8. The electric axle of claim 7, wherein the sleeve has an inner surface defining teeth that mesh with the drive shaft.

9. The electric axle of claim 7, further comprising an actuator assembly including an actuator configured to move the sleeve from the unlocked or disengaged position to the locked or engaged position.

10. The electric axle of claim 9, wherein the actuator includes threading, and the actuator assembly includes a nut configured to rotate about the actuator along the threading to move the actuator in an axial direction.

11. The electric axle of claim 10, further comprising an electric motor configured to rotate a gear to rotate the nut about the actuator.

12. The electric axle of claim 7, further comprising a spring configured to return the sleeve from the locked or engaged position to the unlocked or disengaged position.

13. The electric axle of claim 12, wherein the sleeve includes a radially-extending flange configured to contain the spring axially between the sleeve and the sun gear.

14. The electric axle of claim 7, wherein the teeth of the sleeve mesh with the teeth of the sun gear when the sleeve is located in both the unlocked or disengaged position and the locked or engaged position.

15. An electric axle comprising:
   a planetary gearset including a sun gear;
   a sleeve sized to be fitted about a drive shaft, the sleeve configured to move in an axial direction in a gap between the sun gear and the drive shaft; and
   an actuator assembly configured to force the sleeve in the axial direction to selectively non-rotatably lock the sleeve with both the sun gear and the drive shaft;
   wherein the sleeve includes an inner surface defining teeth that selectively mesh with the drive shaft.

16. The electric axle of claim 15, wherein the sleeve includes a radially-extending flange at one end thereof.

17. The electric axle of claim 16, further comprising a spring located axially between the flange and the sun gear.

* * * * *